April 22, 1952 G. AMEY 2,593,645
TRACTOR COUPLING ARRANGEMENT
Filed April 23, 1948 2 SHEETS—SHEET 1

INVENTOR
Georges Amey
BY
ATTORNEY

April 22, 1952 G. AMEY 2,593,645
TRACTOR COUPLING ARRANGEMENT
Filed April 23, 1948 2 SHEETS—SHEET 2

INVENTOR
Georges Amey
BY
ATTORNEY

Patented Apr. 22, 1952

2,593,645

UNITED STATES PATENT OFFICE 2,593,645

TRACTOR COUPLING ARRANGEMENT

Georges Amey, Les Loges en Josas, France, assignor to Societe Anonyme dite; Automobiles Industriels Latil, Suresnes, France Application April 23, 1948, Serial No. 22,860
In France June 14, 1947

3 Claims. (Cl. 280—33.44)

1

This invention is particularly concerned with tractors designed to haul machines adapted to operate alternatingly in forward and backward motion, and its object is a coupling device that will relieve the driver of the necessity of stepping down, uncoupling, turning round and re-coupling whenever the direction of travel has to be reversed.

With this end in view the device according to the invention is comprised primarily of a loose hauling member, e. g. a chain, and anchoring means whereby said chain can be attached or hooked to a point at the centre of the tractor and to a point of the centre of the machine to be hauled.

The point of attachment on the tractor is located beneath the chassis of the same and may be fixed, although it is preferable to make it adjustable vertically in accordance with the work to be effected or when the machine has to be hauled on a road.

Two embodiments of such a coupling device are illustrated by way of example in the diagrammatic drawing appended hereto.

Figure 1:
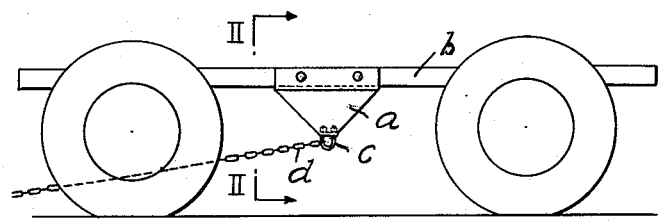
Figure 1 is an elevational view illustrating the provision on a tractor chassis of a fixed point of attachment.
Figure 2:
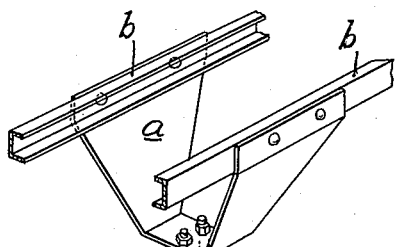
Figure 2 is a perspective view taken on line II—II in Fig. 1.

According to Figs. 1 and 2 a frame $a$ made up of flat- or sectional-iron bars is rigidly secured to the longerons $b$ of the tractor substantially in the middle of the length of the same.

Secured to the under side of said frame is a round iron anchoring stirrup $c$.

The coupling chain $d$ is anchored to said stirrup e. g. by means of a shackle (not shown).

Figure 7:
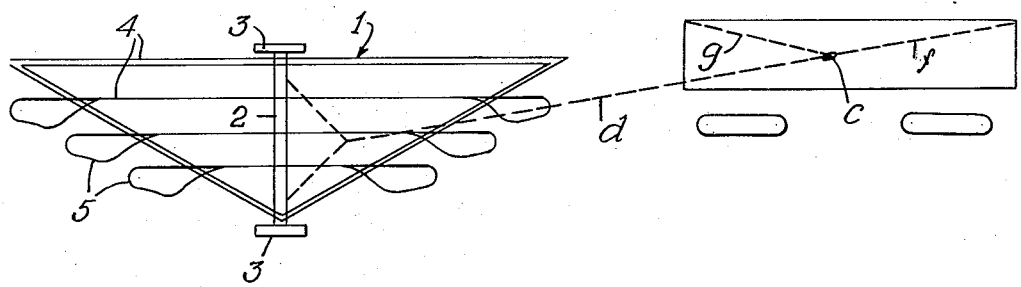
Fig. 7 is a diagrammatic plan showing the tractor coupled to the machine to be handled.
Figure 8:
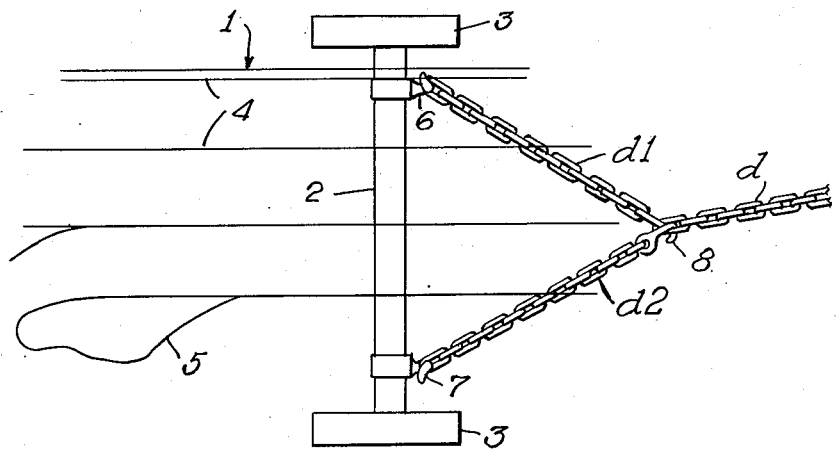
Fig. 8 is an enlarged plan of a portion of the hauled machine showing coupling means.

The opposite end of the chain is attached to the hauled machine as shown in Figs. 7 and 8 at a point in the middle of the same, said machine being intended to operate alternatingly forwards and backwards, e. g. a rocking plow having an axle 2, wheels 3, frame 4 and plow shares 5. An end portion $d1$ of the coupling chain is

2 connected to the plow by a hook 6 provided on the axle 2 and hence at the middle of the plow. An adjustment chain $d2$ is connected to the plow by a second hook 7 near the opposite end of the axle and has a hook 8 which may be fastened into one or another of the links of the main chain to adjust the drift of the plow.

As shown in Figs. 1 and 7 the machine is dragged to the right; once the tractor is at the end of the furrow it will take a new start towards the left by running past the now still machine over the now slack chain; as soon as the chain is stretched again the machine will be towed to the left without any necessity for the driver to step down and worry about uncoupling and re-coupling.

Of course, the chain $d$ must extend freely below the axles of the tractor.

Figure 3:
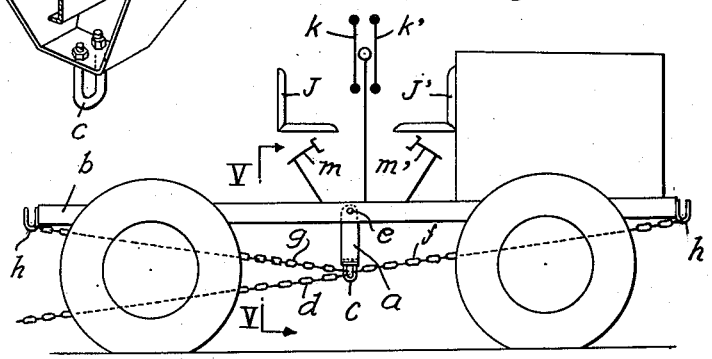
Figure 3 is an elevational view of a tractor provided with movable anchoring means.
Figure 4:
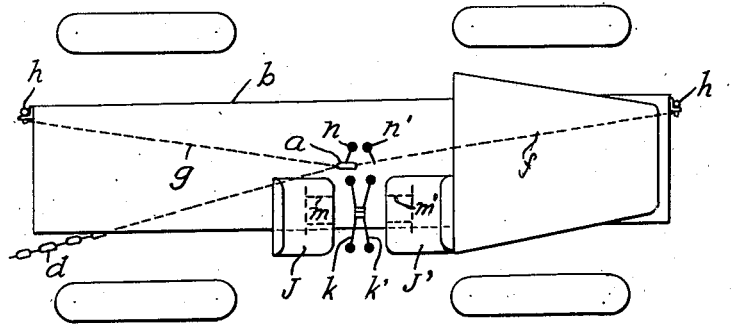
Figure 4 is the corresponding plan view.
Figure 5:
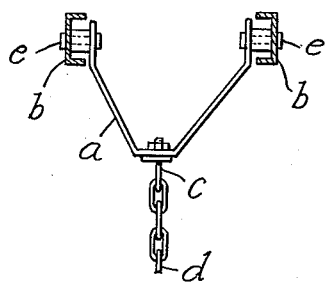
Figure 5 is a cross-sectional view taken on line V—V in Fig. 3.
Figure 6:
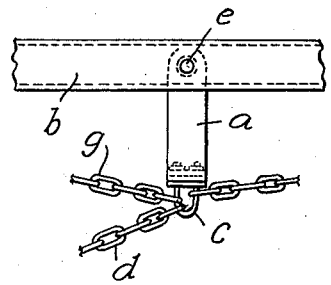
Fig. 6 is a side elevation of the parts shown in Fig. 5.

According to Figs. 3 and 5 the frame $a$, which is similarly made up of flat or sectional iron bars, is fulcrumed to the under side of the chassis by means of trunnions $e$, whereby it is enabled to swing freely fore and aft. It is similarly provided with a U-shaped member $c$ to which the coupling chain $d$ can be secured.

The frame $a$ is connected by a pair of chains $f$, $g$ respectively with the front and the rear end sills of the tractor e. g. by means of hooks $h$, so that depending on which links of either chain is engaged on the related hook the frame can be retained in its vertically depending or any one of its raised positions or remain freely swingable fore-and-aft.

Instead of being located in the medial longitudinal plane of the chassis the stirrup $c$ may be offset with respect to said plane as shown in Fig. 5 so that the connecting chain $d$ shall not come into contact with the wheels as the direction of travel of the tractor is reversed.

By suitably adjusting the respective lengths of chains $f$ and $g$ it is possible to secure the following results:

1. The frame $a$ can be kept in its vertically depending position, usually midway of the length of the tractor.

2. The point at which the chain is anchored to the tractor can be shifted to the front or the rear in either direction of travel, by stretching one of the chains and slackening the other.

3. The frame can be retained in its raised position when the tractor is to run on a road or to perform special duties.

Preferably, the tractor is provided with duplicate seats, the one $j$ for forward running and the other $j'$ for backward running; it is also provided with a duplicate steering wheel $k, k'$, a duplicate pedal set $m, m'$ and a reversing gear $n, n'$.

In plowing and like work the present arrangement affords substantial advantages, viz.:
1. Time is saved at every furrow end;
2. Less ground is left unplowed;
3. Owing to less evolutions being necessary at the ends of the furrows the ground there is less compacted;
4. Less physical exertion is required from the driver;
5. Less fatigue is imposed upon the steering gear;
6. Less fuel is consumed since no turning is required.

What I claim as my invention and desire to secure by Letters Patent is:

1. In a symmetrical amphi-coupled tractor provided with a chassis and four wheels coupled to a hauled machine, a coupling device comprising a frame provided with trunnions and pivotally mounted under the chassis by said trunnions, said frame thereby depending downwardly from the chassis, an anchoring stirrup secured to the lower portion of the frame, two fasteners fixed respectively to the front and rear of the chassis at the sides thereof, two chains connecting the said anchoring stirrup to the two fasteners, connecting means at the middle of the hauled machine, and a third chain connecting the anchoring stirrup to said connecting means.

2. A coupling device for symmetrical amphi-coupled tractor according to claim 1, in which the chains connecting the anchoring stirrup to the fasteners may be adjusted in length independently of each other by the suitable choice of the link of each chain to anchor to the corresponding fastener.

3. In a symmetrical amphi-coupled tractor provided with a chassis and four wheels coupled to a hauled machine, a coupling device comprising a frame provided with trunnions and hinged under the chassis by said trunnions, anchoring stirrups fixed to the underside of the frame, two fasteners fixed respectively to the front and rear of the chassis, said fasteners being placed laterally on the same side of the chassis and the anchoring stirrup being offset in relation to the longitudinal median plane of the tractor at a point on the same side of the chassis, two chains connecting the anchoring stirrup to the two fasteners, connecting means at the middle of the hauled machine, and a third chain connecting the anchoring stirrup to said connecting means.

GEORGES AMEY.

REFERENCES CITED

The following references are of record in the file of this patent:

UNITED STATES PATENTS

| Number | Name | Date |
| --- | --- | --- |
| 2,118,544 | Asbury | May 24, 1938 |
| 2,404,925 | Sauer | July 30, 1938 |

FOREIGN PATENTS

| Number | Country | Date |
| --- | --- | --- |
| 526,140 | France | Oct. 1, 1921 |